United States Patent
Jun et al.

(10) Patent No.: US 7,346,264 B2
(45) Date of Patent: *Mar. 18, 2008

(54) NON-LINEAR REPRODUCTION CONTROL METHOD OF MULTIMEDIA STREAM AND APPARATUS THEREOF

(75) Inventors: Sung Bae Jun, Seoul (KR); Kyoung Ro Yoon, Seoul (KR)

(73) Assignee: LG Electronics, Inc., Seoul (KR)

( * ) Notice: Subject to any disclaimer, the term of this patent is extended or adjusted under 35 U.S.C. 154(b) by 35 days.

This patent is subject to a terminal disclaimer.

(21) Appl. No.: 11/271,281

(22) Filed: Nov. 10, 2005

(65) Prior Publication Data

US 2006/0062549 A1    Mar. 23, 2006

Related U.S. Application Data

(63) Continuation of application No. 09/803,042, filed on Mar. 12, 2001, now Pat. No. 7,149,411.

(30) Foreign Application Priority Data

Mar. 13, 2000  (KR)  ............................... 12489/2000

(51) Int. Cl.
*H04N 5/91* (2006.01)
(52) U.S. Cl. ........................................ 386/68; 386/69
(58) Field of Classification Search ................ 386/83, 386/68, 67, 46, 6, 7, 69, 1
See application file for complete search history.

(56) References Cited

U.S. PATENT DOCUMENTS 5,262,964 A    11/1993  Bonsall et al.
5,377,051 A  * 12/1994  Lane et al. .................... 386/81
5,610,653 A    3/1997   Abecassis
2002/0097278 A1  7/2002  Mandler et al.

FOREIGN PATENT DOCUMENTS

| EP | 0 929 072 A2 | 7/1999 |
| JP | 08-181929 | 7/1996 |
| JP | 08-195934 | 7/1996 |
| JP | 9307841 | 11/1997 |
| JP | 10-228758 | 8/1998 |
| JP | 11-203051 | 7/1999 |
| WO | WO 00/08851 | 2/2000 |

OTHER PUBLICATIONS

Japanese Office Action dated Nov. 2, 2005 for Japanese Application No. 2001-070222, 2 pages.
European Search Report for European Application No. 01302289 dated Aug. 29, 2007, 3 pages.

* cited by examiner

*Primary Examiner*—Robert Chevalier
(74) *Attorney, Agent, or Firm*—Sidley Austin LLP

(57) ABSTRACT

The present invention relates to a non-linear reproduction control method of multimedia stream and an apparatus thereof, the present invention comprises judging a skip direction by interpreting whether a skip request is a forward skip or a backward skip when the skip request is inputted from the user, determining a skip unit by judging whether the user request is a big unit or a small unit, selecting a structural information or semantic information change point of the multimedia stream mostly adjacent to the present reproduction position as a reproduction resume point on the basis of the determined skip direction and skip unit or selecting the reproduction resume point by using the set temporal offset from the preset reproduction position, accordingly it is possible to.

19 Claims, 7 Drawing Sheets

NON-LINEAR REPRODUCTION CONTROL METHOD OF MULTIMEDIA STREAM AND APPARATUS THEREOF

CROSS REFERENCE TO RELATED APPLICATION

The present application is a continuation of application Ser. No. 09/803,042, filed Mar. 12, 2001, now U.S. Pat. No. 7,149,411 the entirety of which is incorporated by reference herein.

BACKGROUND OF THE INVENTION

1. Field of the Invention

The present invention relates to a reproduction control method about a multimedia stream and an apparatus thereof, in particular to a non-linear reproduction control method of a multimedia stream and an apparatus thereof including a forward and a backward skip functions using structural information or semantic information of multimedia content.

2. Description of the Prior Art

Recently, according to development of a digital video technology and an image or a video processing technology, users can search and browse a request part of request multimedia content (drama, movie, documentary etc.) at a request time point.

A shot segmentation technology and a shot clustering technology are basic technologies for performing a non-linear multimedia browsing and searching.

The shot segmentation is a technology for dividing the video stream into each separated shot.

The shot clustering technology is for constructing multimedia content by binding the each shot with logical scenes on the basis of time/image/motion/audio/semantic similarity.

The shot means a sequence of video frames taken from a camera without interruption, it is the most basic unit for analyzing or constructing video, and the video is constructed with lots of shots.

It is possible to browse only intersected section in the video content with the help of structural or semantic index of a multimedia content.

Instance replay function is the most frequently used in non-linear multimedia content browsing.

When a user watches or listens a video or an audio program, the user can watch or listen again an interesting part or a part broadcast for absence by using the instant replay function, the instant replay function can be used in both analog and digital environment.

Recently, it is possible to provide the instant replay function not only about video/audio recorded with an offline but also about a program broadcast or serviced in real-time by the development of a set-top box (Ex Tivo, replay TV) which is capable of performing recording and reproduction concurrently.

Generally, methods for providing the instant replay function uses a set temporal offset using average user reaction time.

When the instant replay is requested, in the method using the average user reaction time, reproduction resumes from a time point which is about 7~seconds previous to the present position by using the average time (7~8 seconds) which is the average program miss time of the user in audition. In order to reproduce the video program from more previous scene, the user can reproduce the request part by performing the instant replay function a plurality of times. Because it is difficult to reproduce the exact starting position of the segment what the user want by using only the conventional instant replay function, a rewind function is usually used together.

In other words, in the conventional instant replay using the average user reaction time, the reproduction is performed by resume reproduction from the point which is fixed times before from the present reproduction. Accordingly the method can not be used when the user requests the instant replay based on the structural or semantic information of a multimedia content.

There is methods similar to the instant replay function using the preset temporal offset such as a method using temporal data blank, a method providing an instant replay function by designation of a user, and a method using physical storing position information of a stream.

The method using the temporal data blank is used in most of music programs, when a plurality of songs are recorded on a magnetic tape, transferring to the previous song or after song is performed by searching a blank region of the temporal data by using a characteristic as a certain time interval of data blank which exists between one song and the other song.

However, the method using the temporal data blank can not be used for searching inner part of a stream in data having no temporal blank such as the multimedia stream, it can be used only for searching a limited unit stored in a limited media such as a magnetic tape for music. In addition, because its control unit is very big, it is difficult to use the method for a non-linear reproduction control function required by the user in the general video or audio program. In other words, the method using the temporal data blank is not the reproduction control method for reproducing from the inner side of the video stream but the reproduction control method for reproducing by the stream unit.

The instant replay function supply method by the user designation is a method designating a reproduction start point before the user requests the instant replay, and is mainly used for listening a certain part repeatedly inside of a stream such as a tape for language study.

Because the reproduction start point has to be designated in the method for providing the instant replay function by the user designation, it is very difficult to use the method for generic video or audio program.

The method using the physical storing position information of the video stream is a method used for a digital media such as a disk for music, because the physical start position about each song is recorded on header information of the disk, it can react to a song unit navigation of the user.

The method using the physical storing position information of the video stream is capable of performing easily the searching by the video stream unit, however the instant replay control unit is very big and it can not correspond to a reproduction control request by regions inside of the video stream, accordingly it is difficult to use the method for the reproduction control method about the generic video or audio program, and the method only can provide a reproduction control function by the stream unit like the method using the temporal data blank.

SUMMARY OF THE INVENTION

The object of the present invention is to provide a non-linear reproduction control method of a multimedia stream and an apparatus thereof which is capable of skipping to a request point in a video/audio program by using structural information or semantic information of the multimedia content.

In order to achieve the object of the present invention, the non-linear reproduction control method of the multimedia stream in accordance with the present invention comprises judging a skip direction by interpreting whether a skip request is a forward skip or a backward skip when the skip request is inputted from the user, determining a skip unit by judging whether the user request is a big unit or a small unit, selecting a structural information or semantic information alternation point of the multimedia stream mostly adjacent to the present reproduction position as a reproduction resuming point on the basis of the determined skip direction and skip unit, and resuming reproduction of the media from the selected point.

The non-linear reproduction control method of the multimedia stream in accordance with the other embodiment of the present invention comprises inputting a forward or backward skip order, b, selecting a reproduction resuming point by considering the present reproduction position, skip direction, structural information or semantic information of the multimedia stream or preset temporal offset information, reproducing the media from the selected reproduction resuming point, displaying additional reproduction resuming candidate points using the structural or semantic information alternation point or point calculated by using a multiple of the temporal offset. The reproduction resuming candidate point(s) will be display on a screen by using a key-frame or a key-region, reproduction will be performed when the user selects the key-frame or key-region displayed on the screen.

The non-linear reproduction control apparatus of the multimedia stream in accordance with the another embodiment of the present invention for reproducing-controlling by considering the present reproduction position, skip direction, structural information or semantic information of the multimedia stream or preset temporal offset information comprises a reproduction unit for reproducing the multimedia stream, an input unit for transmitting a media file reproduction order inputted by a user to a main control unit, a media file constructed with multimedia stream data, an index structure describing the structural information or semantic information of the pertinent multimedia content, and the main control unit for controlling the media file reproduction in accordance with the order inputted from the input unit.

DETAILED DESCRIPTION OF THE PREFERRED EMBODIMENT

A non-linear reproduction control method of a multimedia stream and an method thereof will now described in detail with reference to accompanying drawings.

Figure 1:
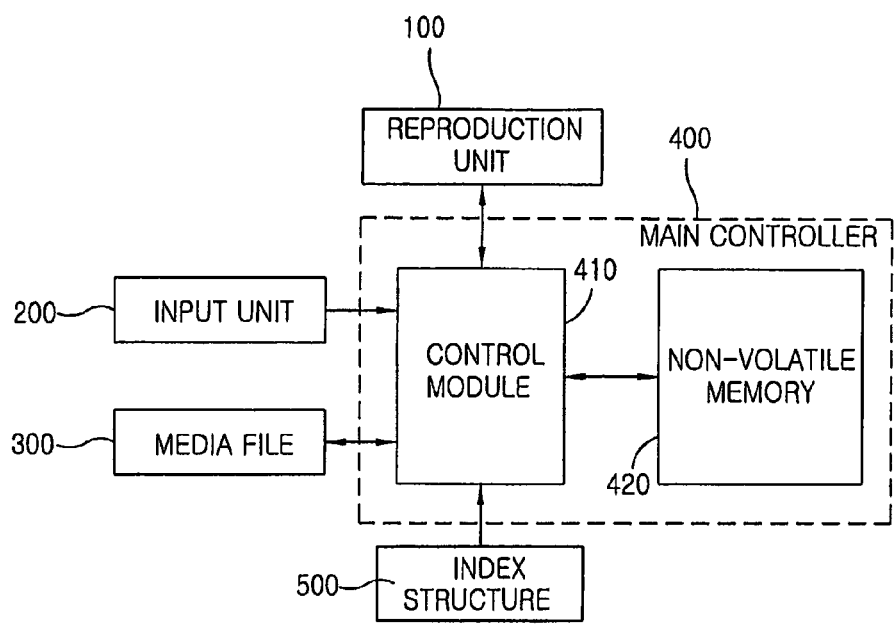
FIG. 1 is a system block diagram for performing a non-linear reproduction control of a multimedia stream in accordance with the present invention.

FIG. 1 is a system block diagram for performing a non-linear reproduction control of a multimedia stream in accordance with the present invention.

It comprises an input unit 200 for transmitting an input by a user to a control module 400 in order to reproduce a media file 300, a control unit 400 for controlling a reproduction unit 100 and the media file 300 by a signal outputted from the input unit 200, the reproduction unit 100 for reproducing a multimedia stream by the control of the main control unit 400, the media file 300 having multimedia stream data, and an index structure 500 describing structural information or semantic information about the multimedia content.

The reproduction unit 100 is a device used for reproducing the multimedia stream which can be a display device, an audio device (Ex speaker) etc. as the reproduction unit 100.

The main control unit 400 comprises a control module 410 and a non-volatile memory 420.

A software program controlling the playback of the media file 300 can be stored in the non-volatile memory 420, content about a basic forward, rewind speed, unit time of a forward/backward skip and the number of boundary points to jump by a big unit skipping and a small unit in the forward/backward skipping etc. can be recorded in the non-volatile memory 420.

The operation of the non-linear reproduction control apparatus of the multimedia stream will now be described as below.

The user inputs a big unit/small unit forward/backward skip order by using methods such as a button operation/mouse operation/voice input/gesture input etc. When the order is inputted to the control module 410, the control module 410 calculates a resuming position by considering the present position, a skip direction and a skip unit and reads the structural information and semantic information stored in index structure 500. After a reproduction point (file pointer etc.) of the media file 300 is adjusted, media file 300 reproduction to the reproduction unit 100 by reproducing the media from the resuming point.

In ordering the forward/backward reproduction by using the button of the input unit such as a remote-controller etc., the user uses the each different button about the big unit skip and small unit skip, and the big unit skip and small unit skip can be divided by setting different operations on the same button.

In setting the different operations on the same button, a method for recognizing the request operation. We can implement the forward/backward skip with big unit and small unit with 2 buttons; double clicks of the button is interpreted as the big unit skip and one click of the button is interpreted as the small unit skip or a short click of the button is interpreted as the small skip and a long click of the button is interpreted as the big unit skip can be used, it is possible also to use the opposite method.

The construction of the video stream for skipping by the big unit and small unit will now be described in detail with reference to accompanying drawings.

Figure 2:
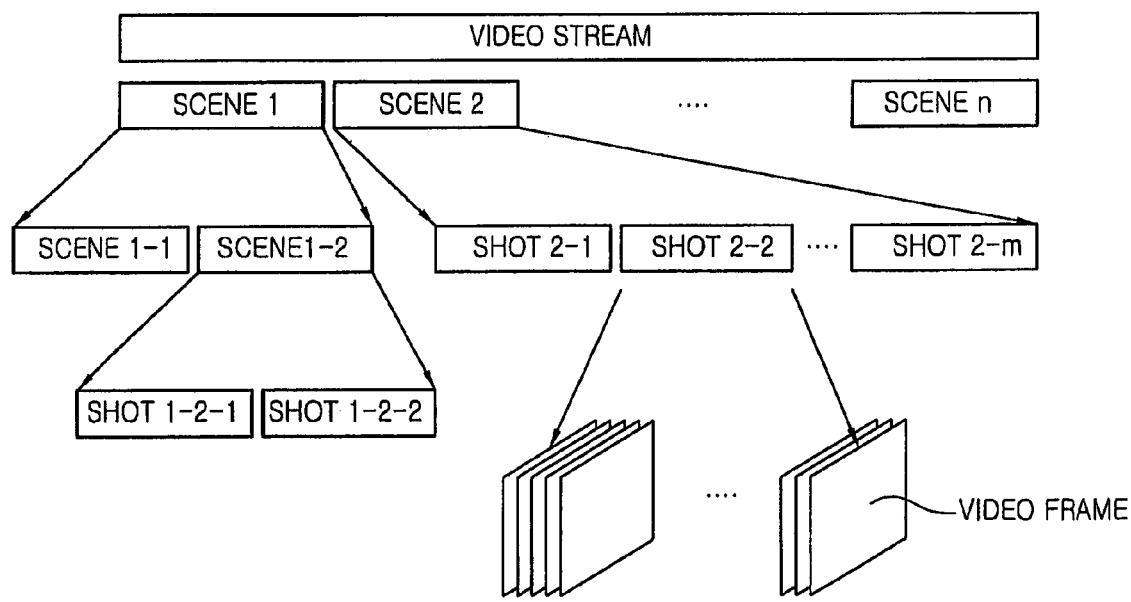
FIG. 2 is a block diagram illustrating structural information of a video stream in accordance with the present invention.

FIG. 2 is a block diagram illustrating structural information of a video stream in accordance with the present invention.

In other words, the video stream is divided into a plurality of scenes, the each scene is constructed with a plurality of sub-scenes or shots, the sub-scene has the characteristic of the scene.

The shot is a sequence of consecutive audio/video frames, it means an editing unit, and the scene means a logical construction unit in the construction of the multimedia stream.

The structural information of the multimedia stream is described with the shot and scene as the basic construction units, and temporal information, namely, a start point and an end point or a start point and a length are described essentially in the each shot and scene.

The indexing system indexes the structural information of the multimedia stream by extracting the shot, and detecting the scenes by using the extracted shot and additional information.

The indexing system also indexes the semantic information exists in the multimedia stream.

The semantic information about the multimedia stream describes an appearance and disappearance of an object, an event occurrence, a state of an object, information about a background etc. with time information.

Figure 3:
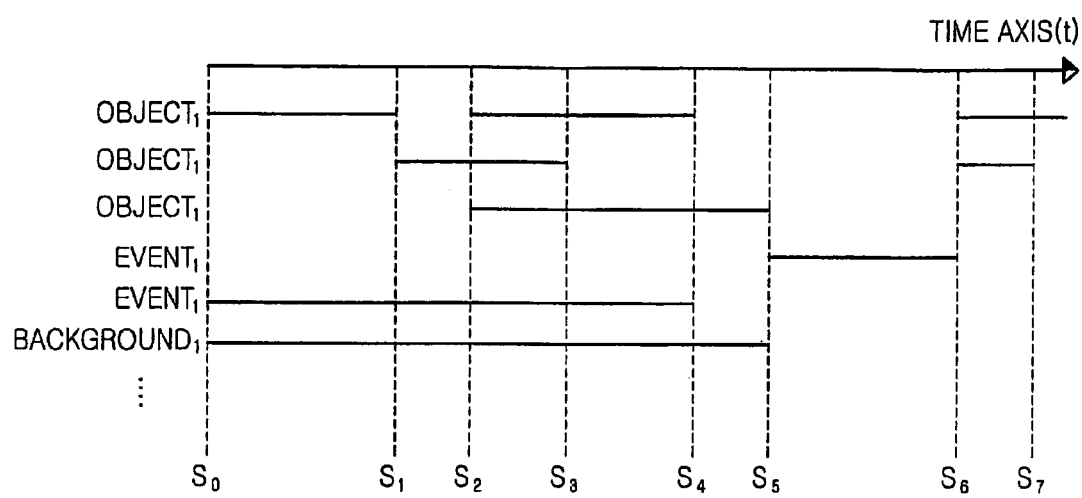
FIG. 3 illustrates an embodiment of a semantic information index for a multimedia stream in accordance with the present invention.

FIG. 3 illustrates an embodiment of a semantic information indexing about a multimedia stream in accordance with the present invention. An $object_1$ exists in $[S_0, S_1]$, $[S_2, S_4]$, $[S_6, \sim]$.

The construction methods of the indexing structure will now be described with reference to accompanying FIG. 4~7.

Figure 4:
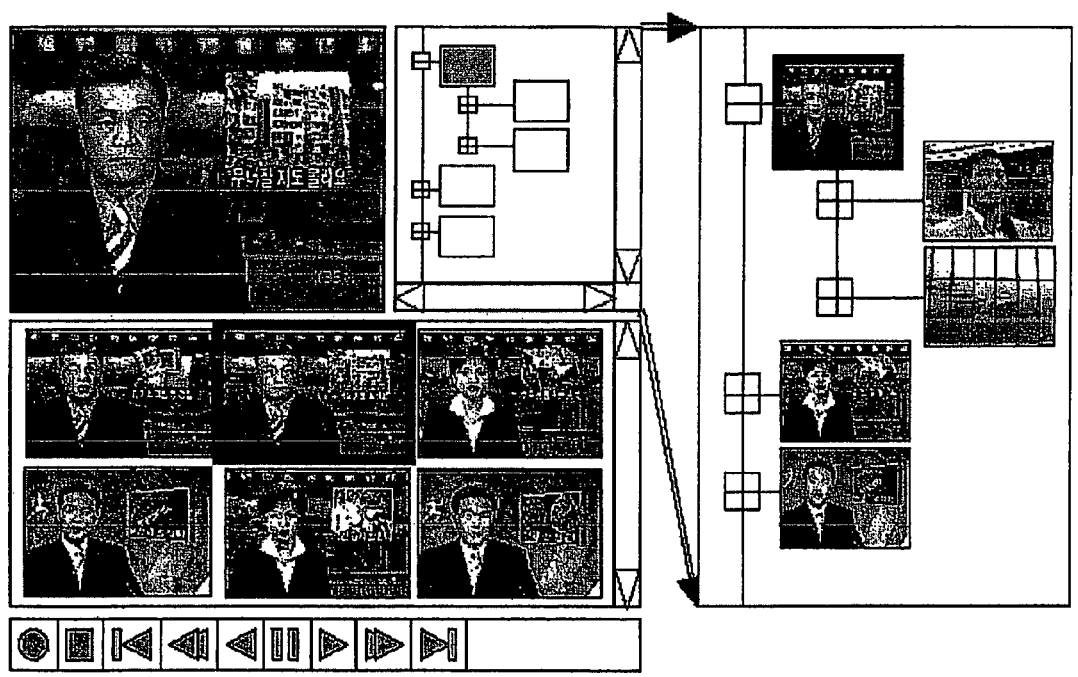
FIG. 4 illustrates an embodiment of a video browsing interface using an multimedia indexing technique for a multimedia stream in accordance with the present invention.

FIG. 4 illustrates an embodiment of a video browsing interface using an index technique about a multimedia stream in accordance with the present invention, the user can access easily to the part of interest in the multimedia stream by using an interface having a TOC (Table of Content) form.

Figure 5:
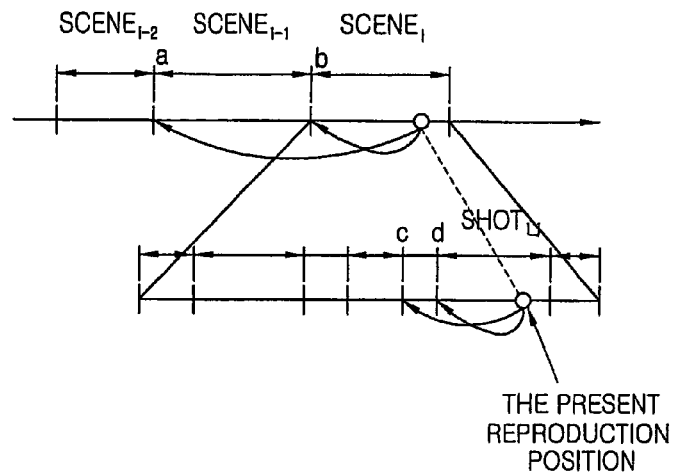
FIG. 5 illustrates an embodiment of an instant replay reproduction control method using structural information of content in accordance with the present invention.

FIG. 5 illustrates an embodiment of an instant replay reproduction control method using structural information of content in accordance with the present invention, the present reproduction position is a certain point of inside of a jth shot ($Shot_{i-j}$) of a ith scene ($Shot_{i-j}$) of the multimedia content.

Herein, when the user request the instant replay by the shot unit, the reproduction is resumed from a 'c' point or a 'd' point, when the user request the instant replay by the scene unit, the reproduction is resumed from a 'a' point or a 'b' point.

Herein, selecting a resuming point between the 'c' and 'd' or 'a' and 'b' can be determined by a method designated by the system, and it is also possible to provide resuming from the 'b' and 'd' points first and provide resuming from the 'a' or 'c' points when the instant replay is requested again within a certain time.

Besides the instant replay control method using the structural information of the multimedia stream, the instant replay function using the semantic information about the multimedia stream can be provided.

The semantic information alternation point will now be described with reference to accompanying FIG. 6.

Figure 6:
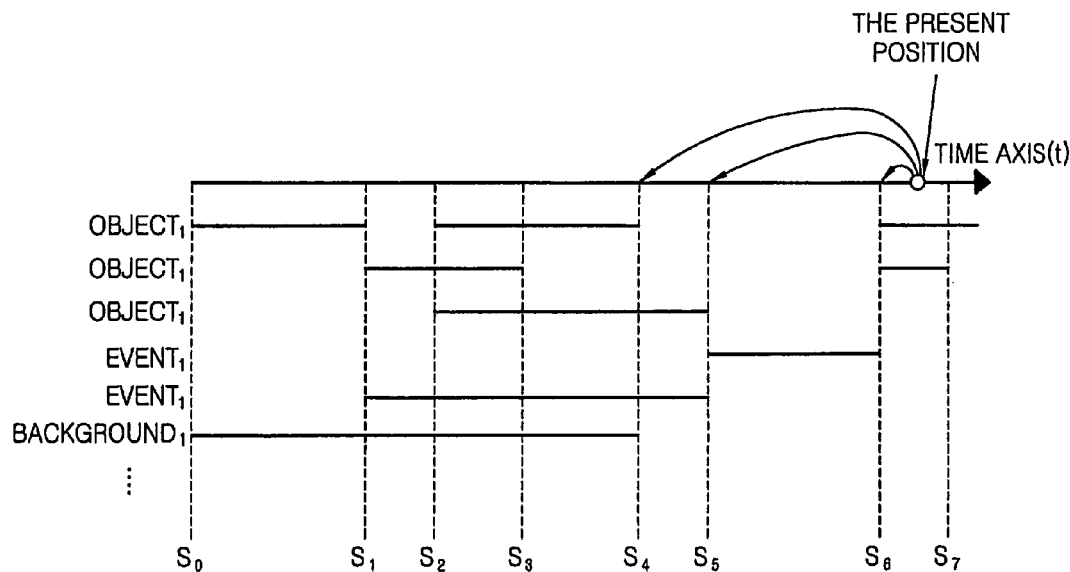
FIG. 6 illustrates an embodiment of an instant replay reproduction control method using semantic index information in accordance with the present invention.

FIG. 6 illustrates an embodiment of an instant replay reproduction control method using semantic indexing information in accordance with the present invention. In the most multimedia streams, alternation of the semantic information occurs, for example, the object appears or disappears in the one scene/shot or through the plurality of shots, or an event occurs and ends etc.

$S_0 \sim S_7$ in FIG. 6 describe the semantic information alternation points, when the non-linear stream reproduction control method using the semantic information is used, the user can skip easily an uninteresting part and can reproduce easily from the starting point of segment of interest by using the semantic index information.

In the instant replay function using the semantic indexing information, when the instant replay by the small unit is requested, the reproduction is resumed from a semantic information alternation point which is one point or two points previous to the present position, when the instant replay by the big unit is requested, the alternation point of the semantic information apart from the current reproduction position with predefined number of semantic information changes for big unit or an event change point or a background change point can be selected as a resuming position.

In other words, when the instant replay by the small unit is requested, the reproduction is restarted from the present reproduction point to the $S_6$ point and when the instant replay by the big unit is requested, the reproduction is restarted from the $S_5$ point where the event is changed or $S_4$ point where the setting is changed.

It is possible to apply the method using the skip unit by the structural information and method using the skip unit by the semantic information at the same time.

Figure 7:
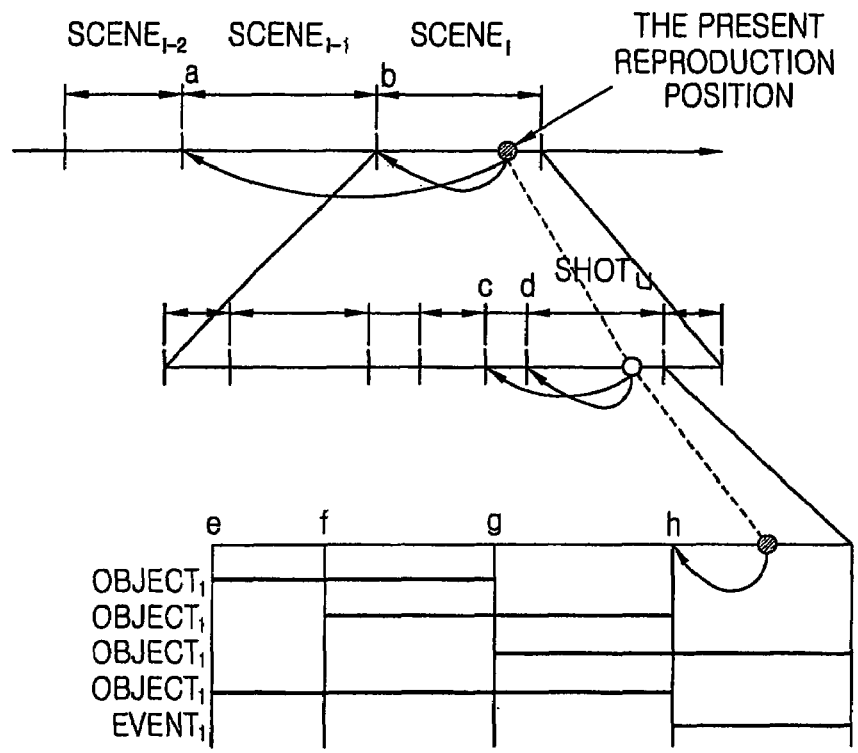
FIG. 7 illustrates an embodiment of an instant replay function using structural information and semantic index information at the same time in accordance with the present invention.

FIG. 7 illustrates an embodiment of an instant replay function using structural information and semantic information at the same time in accordance with the present invention.

When the instant replay by the big unit is requested, a scene unit jump occurs, when the instant replay by the small unit is requested, the semantic information alternation point or a shot unit jump occurs.

In other words, when the instant replay by the big unit is requested from the present reproduction point $Shot_{i-j}$, the reproduction is restarted from the 'a' or 'b'. When the instant replay by the small unit is requested, the reproduction is restarted from the 'c' or 'd' point divided by the structural information or from 'h' point divided by the semantic information.

Figure 8:
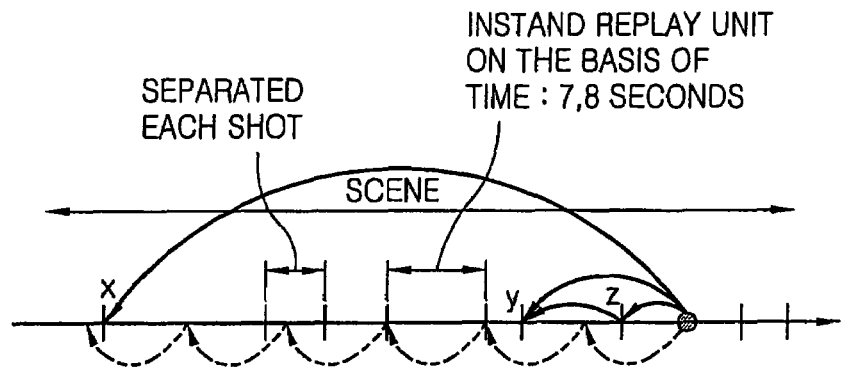
FIG. 8 illustrates an instant replay function using structural information or semantic information in accordance with the present invention on the comparison with the prior art.
Figure 8:
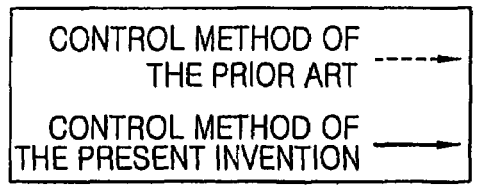

FIG. 8 illustrates an instant replay function using structural information or semantic information in accordance with the present invention on the comparison with the prior art.

In other words, most users use the instant replay function when the reproduction restart to a 'z' or a 'y' or a 'x' point is requested.

In the instant replay request, in the conventional technology, the instant replay function is used several times in order to move the current reproduction position to the x, y, z points as described with arrows.

Accordingly, in order to resume the playback from start position of the segment of interest, the user has to use the instant replay function several times or use the other control function such as a rewind function.

However, the control method in accordance with the present invention can restart the reproduction from the x, y, z points by moving current reproduction position to the x, y, z points directly by using structural information or semantic information of a multimedia stream.

The non-linear reproduction control method using the boundary point of the structural information or semantic information in accordance with the present invention can be used by being combining with the method using the preset temporal offset in accordance with the conventional technology.

The first combining method is selecting the reproduction resuming point by considering the preset temporal offset with the skip direction, skip unit, the reproduction resuming point is selected as the point of the structural information or semantic information change point which is mostly adjacent to a point calculated by using the preset temporal offset and the present reproduction point.

The second combining method is selecting the reproduction resuming point as the point calculated by using the preset temporal offset and the present reproduction point if the distance between the most adjacent structural or semantic information change point and the point calculated by using the preset temporal offset and the present reproduction point is larger than certain threshold, otherwise selecting the reproduction resuming point as the structural or semantic information change point which is the most adjacent to the point calculated by using the preset temporal offset and the present reproduction point.

The examples of the instant replay function embodiment method using the structural information or semantic information will now be described with reference to accompanying FIGS. 9A and 9B.

Figure 9A:
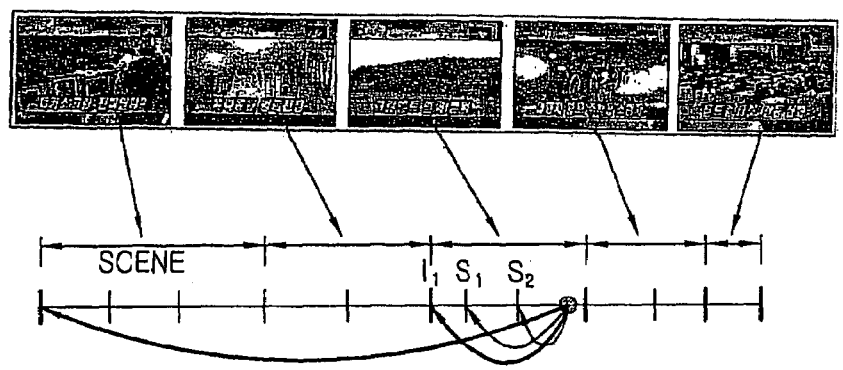
FIGS. 9A and 9B illustrate embodiments of a reproduction control method in case of an instant replay function request in a news video.
Figure 9B:
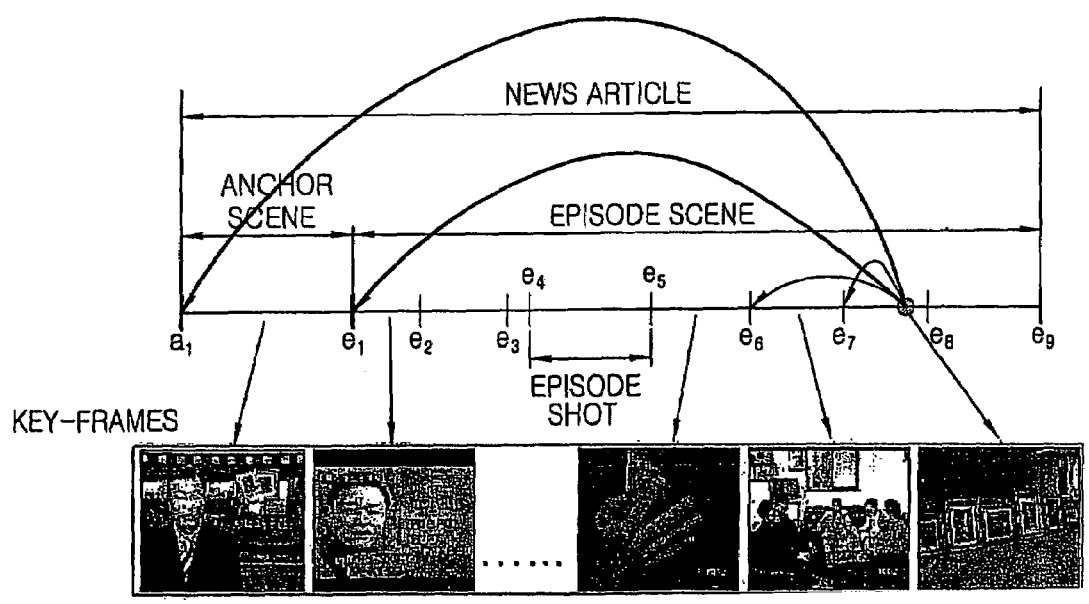

FIGS. 9A and 9B illustrate embodiments of a reproduction control method in case of an instant replay function requested during a news video browsing. FIG. 9A describes about the reproduction resuming position when the instant replay is requested during browsing of a headline of a news in accordance with the present invention, and FIG. 9B describes about the reproduction resuming position when the instant replay is requested during a news item browsing in accordance with the present invention.

A thick boundary line describes a structural information or semantic information change point in big unit, and a thin boundary line describes a structural information or semantic information change point in small unit.

The user can transfer to $S_1$ or $S_2$ or first position of the head line item $I_1$ or the start point of the head line news section $I_2$ directly by requesting the instant replay function once or twice while browsing the head line section.

A user may issue instant replay in order to move the current reproduction position to the start point of the episode scene or to the start point of the news article. In the FIG. 9B, user can directly move the current reproduction position to the start point of the current episode shot $e_7$ or start point of the previous episode shot $e_6$, or start point of the episode scene $e_1$, or start point of new article $e_1$ directly.

Figure 10A:
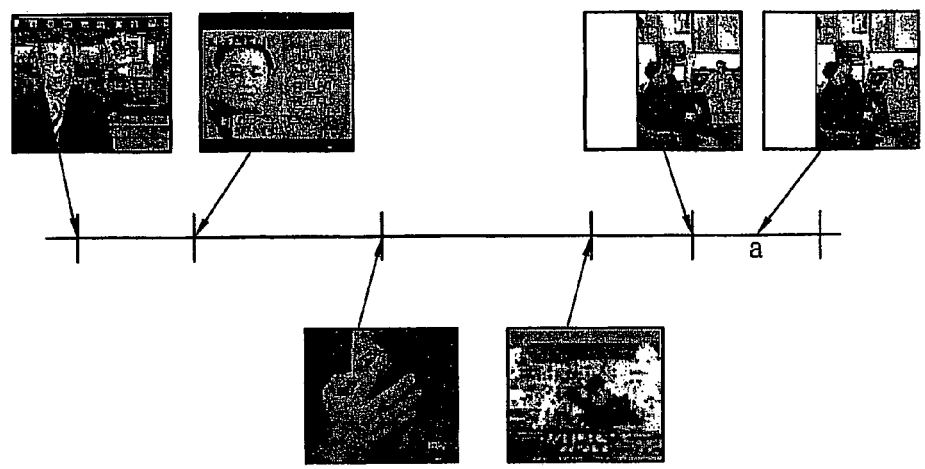
FIGS. 10A and 10B illustrate a screen construction method in an instant replay request in accordance with the present invention.
Figure 10B:
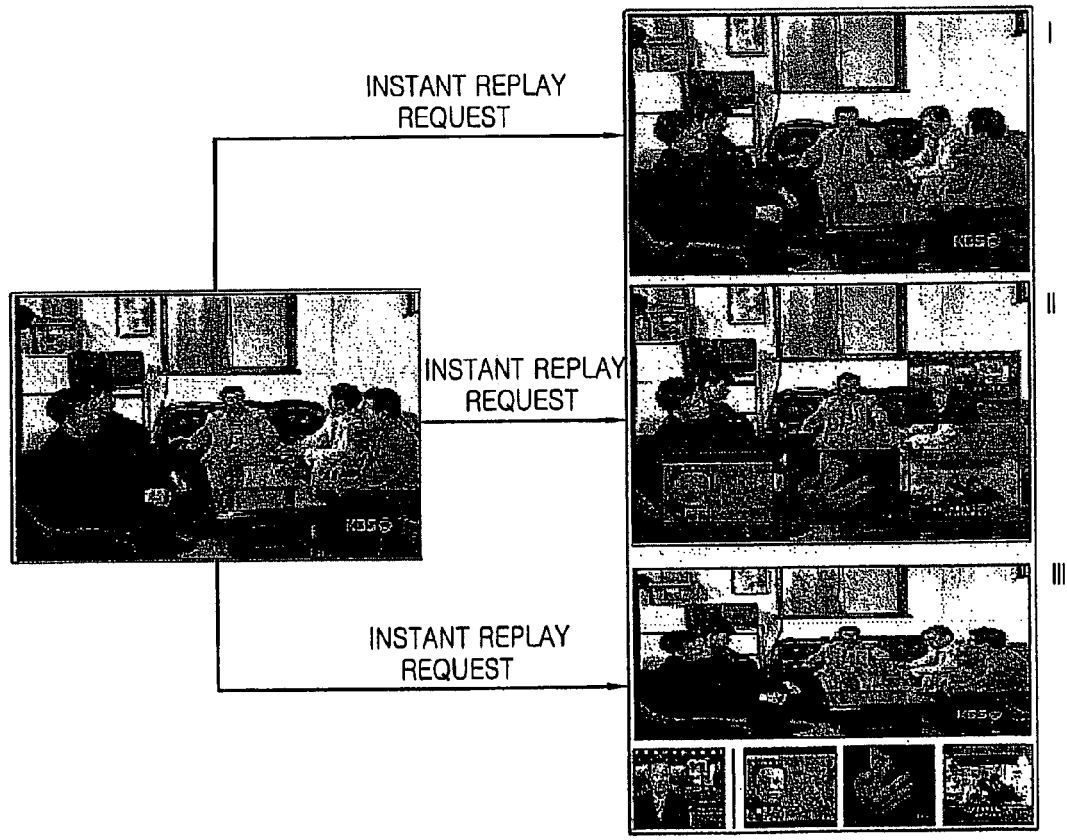

FIGS. 10A and 10B illustrate a screen construction method when an instant replay requested in accordance with the present invention. FIG. 10A is a example video sequence for illustrating display interface related to the related to current invention. Suppose that the current reproduction position is 'a'.

FIG. 10B describes the picture composition method in order to make the user select other resuming position when he or she think the current resuming position is not correct. Because there can be difference between the position the user actually requested and system recommended, system provides more candidate resuming positions which is represented by key region or key frame in order to enable a user to move the current reproduction position to what they actually want. If a user select a key frame or key region, the system will move the current reproduction position to the start position of the segment by which the key region or key frame represent. The each key-frame or key-region is in input standby state, the one can be selected by a default.

In addition, an interface which displays separately a big unit candidate point and a small unit candidate point by dividing the skip unit into the big unit and small unit and differentiating vertical or horizontal arrangement of them can be adapted to the each key-frame or key-region.

A third picture in FIG. 10B uses a method displaying the key-frame or key-region about the candidate point vertically or horizontally by adjusting a size of a picture to be displayed, herein the key-frame/key-region is in the input standby state, the one can be selected by default.

In addition, the candidate point in the big unit and candidate point in the small unit are provided to the user by being separated to vertically/horizontally or through additional methods in order to make the user know the point.

The described picture composition method can be adapted to the forward skip function also as well as the instant replay (the backward skip).

The non-linear reproduction control method using the structural information or semantic information of the multimedia content in accordance with the present invention can be used for forward skip as well as backward skip(instant replay) In the method, a skip unit is determined by not only using the average user reaction time in the prior art, but also considering structural or semantic index at the same time, and a point where the structural information or semantic information alters is selected as a reproduction resuming position after skip.

In addition, the forward/backward skip method using the structural information or semantic information about the multimedia content in accordance with the present invention can be arranged with the conventional method on the basis of the time.

Figure 11:
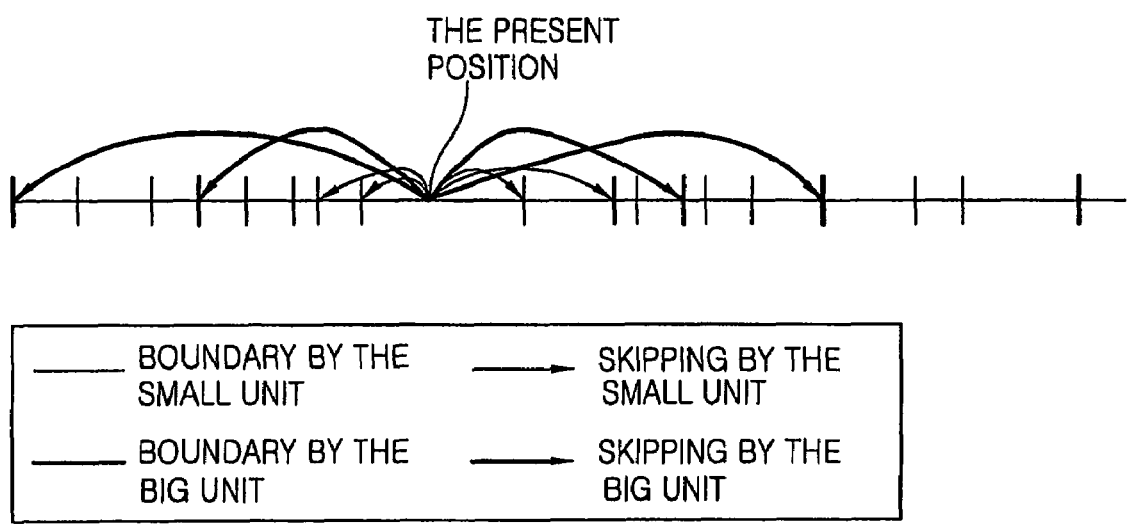
FIG. 11 illustrates a forward/backward skip position using structural information and semantic information for a multimedia stream in accordance with the present invention.

FIG. 11 illustrates a forward/backward skip position using structural information and semantic information about a multimedia stream in accordance with the present invention.

The reproduction control method using the structural information or semantic information about the multimedia content in accordance with the present invention can be adapted to content recorded with the offline, and can be applied to multimedia content broadcast or serviced in real-time.

The reproduction control method using the structural information or semantic information about the multimedia content in accordance with the present invention can be adapted to all audio/video genres, is possible to perform the reproduction control of the non-linear multimedia stream by the big unit and small unit, and can be applied to a skip of commercial advertisement.

In addition, in order to perform the non-linear multimedia reproduction control, the present invention for providing the forward/backward skip can provide more convenient forward/backward skip function by providing the interface using the key-frame or key-region when the user requests the forward/backward skip.

Meanwhile, there is a plurality of input means for requesting the instant replay such as a button, a mouse, voice input, gesture input etc. can be used.

As described above, the present invention enable users to skipping a uninteresting part, browsing only interesting part. The present invention can be implemented with very simple input device and a user can watch/listen the video in the optimum state.

What is claimed is:

1. A method for controlling the playback of a stream of multimedia content, the method comprising:
storing a plurality of index points, each index point corresponding to one of semantic information or structural information for the stream of multimedia content, wherein the index points corresponding to semantic information allow a user to skip through the stream of multimedia content at meaningful points in the stream of multimedia content, wherein the index points corresponding to structural information allow a user to skip through the multimedia stream at each shot or scene in the stream of multimedia content;
playing back the stream of multimedia content for presentation to a user;
receiving a request from the user to skip through the stream of multimedia content; and
resuming play back of the stream of multimedia content at the next index point in the stream.

2. The method of claim 1 wherein the index points are extracted by manual process.

3. The method of claim 1 wherein the index points are created by the user.

4. The method of claim 1 wherein the request from the user comprises a request to skip forward.

5. The method of claim 1 wherein the request from the user comprises a request to skip backward.

6. The method of claim 1 comprising identifying the next index point in the multimedia stream of content.

7. The method of claim 1 wherein at least some of the index points are associated with respective segments of the multimedia stream, and wherein the segments are non-contiguous.

8. A method for controlling the playback of a stream of multimedia content, the method comprising:
providing an index structure comprising a plurality of index points, wherein each index point corresponds to one of semantic information or structural information for the stream of multimedia content, wherein the index points corresponding to semantic information allow a user to skip through the stream of multimedia content at meaningful points in the stream of multimedia content, wherein the index points corresponding to structural information allow a user to skip through the multimedia stream at each shot or scene in the stream of multimedia content;
playing back the stream of multimedia content for presentation to a user;
during play back, receiving at a first point in the stream of multimedia content a request from the user to skip through the stream of multimedia content;
in response to the request from the user to skip, accessing the index structure; and
resuming play back of the stream of multimedia content at an index point either forward of or backward from the first point.

9. The method of claim 8 further comprising storing the index structure.

10. The method of claim 8 further comprising receiving the multimedia stream.

11. The method of claim 8 wherein the index points are extracted by manual process.

12. The method of claim 8 wherein the index points are created by the user.

13. The method of claim 8 wherein the request from the user comprises a request to skip forward.

14. The method of claim 8 wherein the request from the user comprises a request to skip backward.

15. The method of claim 8 wherein at least some of the index points are associated with respective segments of the multimedia stream, and wherein the segments are non-contiguous.

16. A method for controlling the playback of a stream of multimedia content, the method comprising:
storing a plurality of index points, each index point corresponding to one of semantic information or structural information for the stream of multimedia content, wherein the index points corresponding to semantic information allow a user to skip through the stream of multimedia content at meaningful points in the stream of multimedia content, wherein the index points corresponding to structural information allow a user to skip through the multimedia stream at each shot or scene in the stream of multimedia content;
playing back the stream of multimedia content for presentation to a user;
during play back, receiving at a first point in the stream of multimedia content a request from the user to skip through the stream of multimedia content;
determining whether the received request is a request to skip forward or a request to skip backward;
if the received request is a request to skip forward, resuming play back of the stream of multimedia content at an index point in the stream of multimedia content which comes after the first point in the stream of multimedia content; and
alternatively, if the received request is a request to skip backward, resuming play back of the stream of multimedia content at an index point which comes before the first point in the stream of multimedia content.

17. The method of claim 16 wherein the index points are extracted by manual process.

18. The method of claim 16 wherein the index points are created by the user.

19. The method of claim 16 wherein at least some of the index points are associated with respective segments of the multimedia stream, and wherein the segments are non-contiguous.

* * * * *